United States Patent
Jackson

(10) Patent No.: US 9,128,700 B2
(45) Date of Patent: Sep. 8, 2015

(54) RESTORING A REGISTER RENAMING MAP

(75) Inventor: Hugh Jackson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 617 days.

(21) Appl. No.: 13/563,025

(22) Filed: Jul. 31, 2012

(65) Prior Publication Data

US 2013/0179665 A1     Jul. 11, 2013

(30) Foreign Application Priority Data

Jan. 6, 2012   (GB) .................................. 1200172.3

(51) Int. Cl.
*G06F 9/38*     (2006.01)
*G06F 9/30*     (2006.01)

(52) U.S. Cl.
CPC ............ *G06F 9/30043* (2013.01); *G06F 9/384* (2013.01); *G06F 9/3863* (2013.01); *G06F 9/3836* (2013.01)

(58) Field of Classification Search
None
See application file for complete search history.

(56) References Cited

U.S. PATENT DOCUMENTS

| | | | |
|---|---|---|---|
| 5,881,305 A * | 3/1999 | Walker | ............................. 712/23 |
| 2005/0120191 A1 | 6/2005 | Akkary et al. | |
| 2005/0251654 A1 | 11/2005 | Altman et al. | |
| 2007/0043934 A1 | 2/2007 | Sodani et al. | |
| 2007/0101110 A1 | 5/2007 | Kishore | |
| 2008/0077778 A1 | 3/2008 | Davis et al. | |
| 2008/0276076 A1 * | 11/2008 | Abernathy et al. | ........... 712/217 |
| 2010/0312993 A1 | 12/2010 | I et al. | |

FOREIGN PATENT DOCUMENTS

GB     2388449 A     11/2003

OTHER PUBLICATIONS

Search Report in EP12196230.2 dated Apr. 22, 2013.
Exam Report in GB1119327.3.
European search report from corresponding EP application No. 14159851.6 dated Jun. 4, 2014.

* cited by examiner

*Primary Examiner* — Kris Rhu
(74) *Attorney, Agent, or Firm* — Vorys, Sater, Seymour and Pease LLP; Vincent M DeLuca

(57) ABSTRACT

A technique for restoring a register renaming map is described. In one example, a restore table having a number of storage locations saves a copy of the register renaming map whenever a flow-risk instruction is passed to a re-order buffer. When all storage locations are full, further instructions still pass to the re-order buffer, but a copy of the map is not saved. A storage location subsequently becomes available when its associated flow-risk instruction is executed. A register renaming map state for an unrecorded flow-risk instruction passed to the re-order buffer while the storage locations were full is generated and stored in the available location. This is generated using the restore table entry for a previous flow-risk instruction and re-order buffer values for intervening instructions between the previous and unrecorded flow-risk instructions. The restore table can be used to restore the map if an unexpected change in instruction flow occurs.

20 Claims, 7 Drawing Sheets

RESTORING A REGISTER RENAMING MAP

CROSS REFERENCE TO RELATED APPLICATIONS

This application claims priority to GB App. Ser. No. 1200172.3, filed Jan. 6, 2012, and entitled "Restoring a Register Renaming Map" and which is incorporated in its entirety herein for all purposes

BACKGROUND

Out-of-order microprocessors can provide improved computational performance by executing instructions in a sequence that is different from the order in the program, so that instructions are executed when their input data is available rather than waiting for the preceding instruction in the program to execute. In order to allow instructions to run out-of-order on a microprocessor it is useful to be able to rename registers used by the instructions. This enables the removal of "write-after-read" (WAR) dependencies from the instructions as these are not true dependencies. By using register renaming and removing these dependencies, more instructions can be executed out of program sequence, and performance is further improved. Register renaming is performed by maintaining a map of which registers named in the instructions (called architectural registers) are mapped onto the physical registers of the microprocessor.

However, the flow of instructions in a program can sometimes change during execution. For example, in the case of branch instructions, branch prediction is often used to predict which instruction branch will be taken, to allow the instructions in the predicted branch to be speculatively executed out-of-order. This means that branch mispredictions can occur, which can be realised after having sent many speculative instructions through the register renaming stage and into the execution pipelines. To allow the program flow to be reset and continue correctly after an incorrectly predicted branch is taken, the register renaming map is "rewound" to the state that it was in at the time that the mispredicted branch passed through the register renaming stage. Similar effects are also seen in the case that other instructions cause unexpected changes in program flow, such as interrupts or exceptions.

Current out-of-order processors enable the rewinding of the register renaming map by saving a snapshot of the register renaming map whenever an instruction that may be a flow risk goes through the register renaming stage (a flow risk here includes interrupts, exceptions, branches or any other instruction which may cause a change in the execution flow when it is executed). However, this requires the provision of a large amount of storage in which to save all the snapshots, because if all the snapshot storage is used then the instruction stream must be stalled until snapshots can again be saved, which compromises performance.

The embodiments described below are not limited to implementations which solve any or all of the disadvantages of known out-of-order microprocessors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technique for restoring a register renaming map is described. In one example, a restore table having a number of storage locations saves a copy of the register renaming map whenever a flow-risk instruction is passed to a re-order buffer. When all storage locations are full, further instructions still pass to the re-order buffer, but a copy of the map is not saved. A storage location subsequently becomes available when its associated flow-risk instruction is executed. A register renaming map state for an unrecorded flow-risk instruction passed to the re-order buffer whilst the storage locations were full is generated and stored in the available location. This is generated using the restore table entry for a previous flow-risk instruction and re-order buffer values for intervening instructions between the previous and unrecorded flow-risk instructions. The restore table can be used to restore the map if an unexpected change in instruction flow occurs.

According to one aspect, there is provided a method of restoring a register renaming map in an out-of-order processor, comprising: storing a copy of the register renaming map state in a storage location of a restore table whenever a flow-risk instruction is inserted into a re-order buffer, until all storage locations are utilised; determining that a storage location has subsequently become available; generating a derived register renaming map state for an unrecorded flow-risk instruction inserted into the re-order buffer whilst all storage locations were utilised, based on a previously stored register renaming map state for an older flow-risk instruction and values stored in the re-order buffer for intervening instructions inserted between the older flow-risk instruction and the unrecorded flow-risk instruction; storing the derived register renaming map state for the unrecorded flow-risk instruction at the available storage location; and in the event that execution of one of the flow-risk instructions causes an unexpected change in instruction flow, restoring the register renaming map using the register renaming map state associated with that flow-risk instruction in the restore table.

According to another aspect there is provided an out-of-order processor, comprising: a register renaming map; a re-order buffer; and a restore table comprising a plurality of storage locations, wherein the processor is arranged to: store a copy of the register renaming map state in one of the storage locations responsive to a flow-risk instruction being inserted into the re-order buffer, until all storage locations are utilised; determine that a storage location has subsequently become available and, responsive thereto, generate a derived register renaming map state for an unrecorded flow-risk instruction inserted into the re-order buffer whilst all storage locations were utilised, based on a previously stored register renaming map state for an older flow-risk instruction and values stored in the re-order buffer for intervening instructions inserted between the older flow-risk instruction and the unrecorded flow-risk instruction; store the derived register renaming map state for the unrecorded flow-risk instruction at the available storage location; and in the event that execution of one of the flow-risk instructions causes an unexpected change in instruction flow, restore the register renaming map using the register renaming map state associated with that flow-risk instruction in the restore table.

The methods described herein may be performed by software in machine readable form on a tangible storage medium e.g. in the form of a computer program comprising computer program code to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The above features may be combined as appropriate, as would be apparent to a skilled person, and may be combined with any of the aspects of the examples.

BRIEF DESCRIPTION OF THE DRAWINGS

Embodiments will be described, by way of example, with reference to the following drawings, in which.

Figure 1:
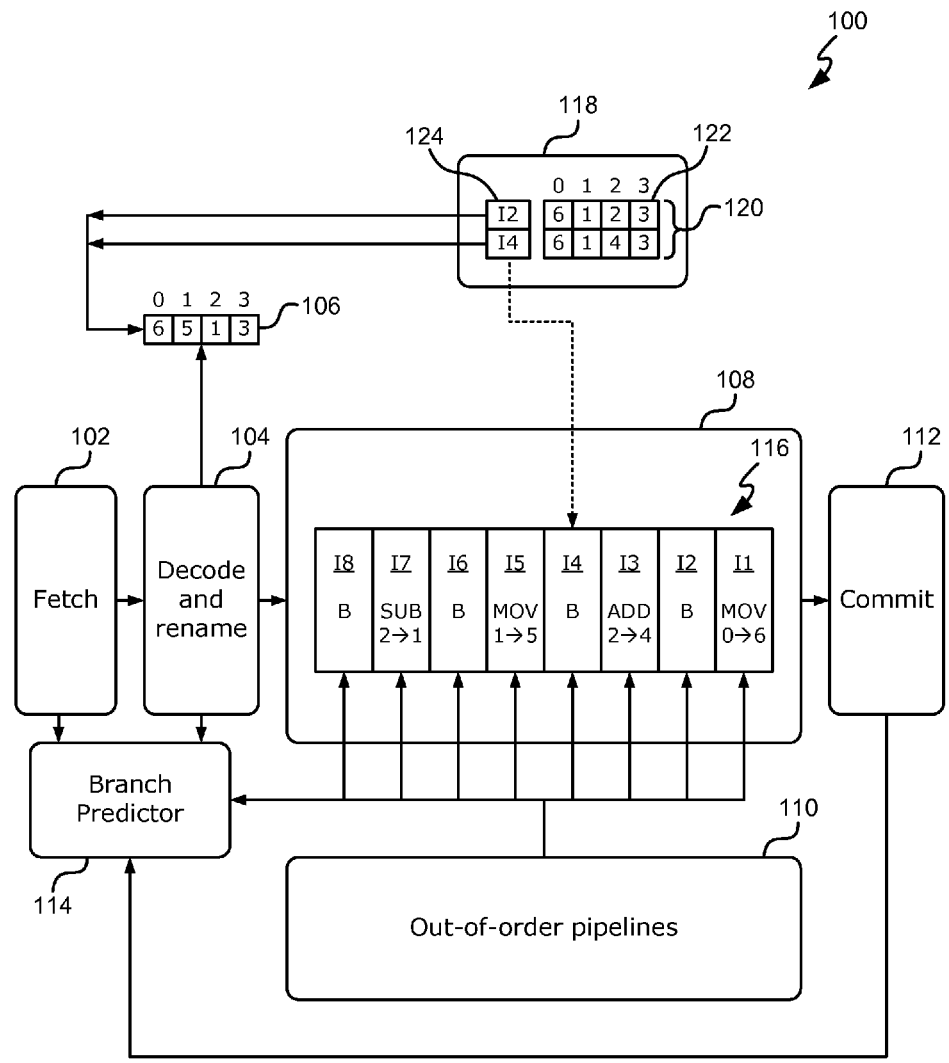
FIG. 1 illustrates an out-of-order processor having a register renaming map restore table.

Common reference numerals are used throughout the figures to indicate similar features.

DETAILED DESCRIPTION

Embodiments are described below by way of example only. These examples represent the best ways of putting the embodiments into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described below is a technique for restoring a register renaming map in order to recover from an unexpected change in program flow in an out-of-order processor. Two techniques are described, which can be combined to further improve performance. The first technique reduces the amount of the storage space used to enable recovery from an unexpected flow change, compared to techniques that save a snapshot of the register renaming map state for every flow-risk instruction that is issued. This technique reserves a predefined number of storage locations in a "restore table" for storing copies of the register renaming map state whenever a flow-risk passes through the register renaming stage. However, once all of these storage locations are full, then the instruction stream is not stalled, and instructions are still allowed to pass through the register renaming stage.

When a flow-risk instruction is subsequently executed, the copy of the register renaming map state associated with this instruction is no longer needed, so can be discarded. This frees up a storage location. A register renaming map state for an unrecorded flow-risk instruction that passed through the renaming stage while the storage locations were full (i.e. one for which a copy of the register renaming map was not previously stored) can be derived by starting from a previously stored register renaming map state for an older flow-risk instruction, and updating this by working along the intervening instructions to the newer unrecorded flow-risk instruction. If needed, this derived register renaming map state can be used to restore the register renaming map in the case that this flow-risk instruction causes unexpected change in program flow. This technique enables a smaller amount of storage to be used for saving the register renaming map state, and does not stall the instruction stream when all the storage locations are full, but still allows recovery from situations such as branch misprediction that need to be performed as fast as possible.

The second technique also reduces the amount of storage space that is needed to restore a register renaming map. This is achieved by maintaining a copy of the register renaming map state for committed instructions in a "register commit map", i.e. the register renaming map state is saved for those instructions at the end of the out-of-order section of the processor. Once an instruction is committed, it is no longer at risk of being "rewound" in the case that the register renaming map is restored. By maintaining a register commit map, the register renaming map can be restored by copying the register commit map state to the register renaming map when the instruction causing the unexpected change in program flow reaches the commit stage. This reduces the amount of storage space because snapshots of the register renaming map do not need to be saved for all types of flow-risk instruction. Instead, those instructions that may cause a flow risk close to commit time or instructions that should not cause a flow change in normal operation but still need to be handled when they do (such as exceptions) are restored using the space-efficient register commit map.

The first technique is firstly described with reference to FIGS. 1 to 5, and the addition of the second technique is described below with reference to FIGS. 6 and 7.

Reference is first made to FIG. 1, which shows an out-of-order processor 100 having a register renaming map restore table. The out-of-order processor comprises a fetch stage 102 arranged to fetch instructions from a program (in program order) as indicated by a program counter (PC), and a decode and renaming stage 104 arranged to interpret the instructions and perform register renaming. Register renaming enables more instructions to be executed out-of-order, by removing write-after-read (WAR) dependencies. For example, consider the following two instructions (denoted I1 and I2):

$$R3=R1+2 \qquad \text{I1}$$

$$R1=R2 \qquad \text{I2}$$

Because R1 is the destination register of I2, I2 cannot be evaluated before I1, as otherwise the value stored in R1 is incorrect when I1 is evaluated. However, there is not a "true" dependency between the instructions, and this means that register renaming can be used. For example, I2 can have its destination register renamed as follows:

$$R4=R2 \qquad \text{I2}$$

Because the destination register has been changed to R4, there is now no dependency between I1 and I2, and these two instructions can be executed out-of-order. Register renaming can be performed by the renaming stage 104 by maintaining a mapping between architectural and physical registers on the processor. Architectural registers are the names/identifiers of registers used in the instructions. Physical registers are the actual storage locations present on the processor. Generally, there are more physical registers than architectural registers.

The renaming stage 104 determines which architectural registers are allocated to which physical registers for each instruction, and by doing this WAR dependencies can be removed. For example, considering the example above, when I1 is passed to the renaming stage, architectural register R1 can be mapped to physical register P1, but when I2 is passed to the renaming stage, architectural register R1 can be mapped to physical register P2. This means that these instructions will not clash, as R1 in each instruction maps to a different storage location.

The renaming stage 104 maintains a register renaming map 106, which is a stored data structure showing the mapping between each architectural register and the physical register that was most recently allocated to it. In the example of FIG. 1, the register renaming map 106 comprises four entries indicating the physical register identifiers, indexed by the architectural register identifiers. For example, architectural register 0 currently maps to physical register 6, architectural register 1 currently maps to physical register 5, etc.

When an instruction passes through the renaming stage 104, it is inserted into a re-order buffer 108 (ROB). The re-order buffer 108 is a buffer that enables the instructions to be executed out-of-order, but committed in-order. The re-order buffer 108 holds the instructions that are inserted into it in program order, but the instructions within the ROB can be executed out of sequence by out-of-order pipelines 110. In some examples, the re-order buffer 108 can be formed as a circular buffer having a head pointing to the oldest instruction in the ROB, and a tail pointing to the youngest instruction in the ROB. Instructions are output from the re-order buffer 108 in program order. In other words, instructions are output from the head of the ROB when that instruction has been executed by the pipelines 110, and the head is incremented to the next instruction in the ROB. Instructions output from the re-order buffer 108 are provided to a commit stage 112, which commits the result of the instruction to the register/memory.

The processor also comprises a branch predictor 114, which is arranged to predict which direction the program flow will take in the case of instructions known to cause possible flow changes, such as a branch instruction. Branch prediction is useful as it enables instructions to be speculatively executed by the out-of-order processor before the outcome of the branch instruction is known. The branch predictor 114 can receive inputs from the fetch stage 102 and decode and renaming stage 104 relating to new instructions, and input from the pipelines 110 and commit stage 112 relating to how issued instructions have executed.

When the branch predictor 114 predicts the program flow accurately, this improves performance of the processor. However, if the branch predictor 114 does not correctly predict the branch direction, then a misprediction occurs which needs to be corrected before the program can continue. To correct a misprediction, the speculative instructions sent to the ROB are abandoned, and the fetch stage 102 starts fetching instructions from the correct program branch. However, the register renaming map 106 also needs correction, as this has been updated by the speculative instructions passing through the renaming stage 104. The register renaming map 106 therefore needs to be rewound to restore the state it was in prior to the incorrectly predicted branch instruction.

In addition to branch mispredictions, as outlined above, similar unexpected changes in program flow can also occur as a result of interrupts or exceptions. These situations also result in the register renaming map 106 needing to be restored. Note that the term "flow-risk" is used herein to mean any instruction that can result in an unexpected change in the program flow, including for example branch instructions, interrupts or exceptions. In other words, a flow-risk instruction is any instruction that can cause a change to the program counter of the processor.

One way to handle the restoration of the register renaming map 106 is to save a snapshot of the register renaming map state every time a flow-risk instruction passes through the renaming stage 104, such that each flow-risk instruction inserted into the re-order buffer 108 has an associated stored register renaming map state. Then, if one of these flow-risk instructions causes an unexpected change in program flow, the register renaming map 106 can be restored using the stored state associated with the offending flow-risk instruction. However, this requires a large amount of storage space to be provisioned for saving these snapshots, as there can be a large number of flow-risk instructions potentially present ("in-flight") in the re-order buffer 108 at any one time. If insufficient storage space was present, and this became fully utilised with snapshots, then the instruction stream must be stalled until space becomes available, as otherwise the register renaming map 106 could not be restored in the case of an unexpected program flow change.

For example, FIG. 1 shows an illustrative re-order buffer 108 having eight entries 116. Each entry is an instruction, and in this example four of the entries are branch instructions (with an instruction denoted "B" in FIG. 1) and are therefore flow risks. However, to avoid any possibility of the instruction stream being stalled, eight storage locations would need to be provided to save snapshots of the register renaming map 106, as this is the potential number of flow-risk instructions in-flight.

FIG. 1 illustrates an alternative technique for handling the restoration of the register renaming map 106 that does not use as much storage space. This technique utilises a restore table 118. The restore table 118 has a predefined number of storage locations that can be used to store a copy of the register renaming map state, and be used in its restoration. However, the number of storage locations in the restore table 118 may be less than the potential number of flow-risk instructions in-flight without being detrimental the processor operation, as outlined in more detail below. In the example of FIG. 1, the restore table 118 comprises two storage locations 120. Note that in other examples, different numbers of storage locations can be present. Each storage location comprises a copy of a register renaming map state 122 and an identifier 124 of the flow-risk instruction in the ROB associated with that register renaming map state 122.

Figure 2:
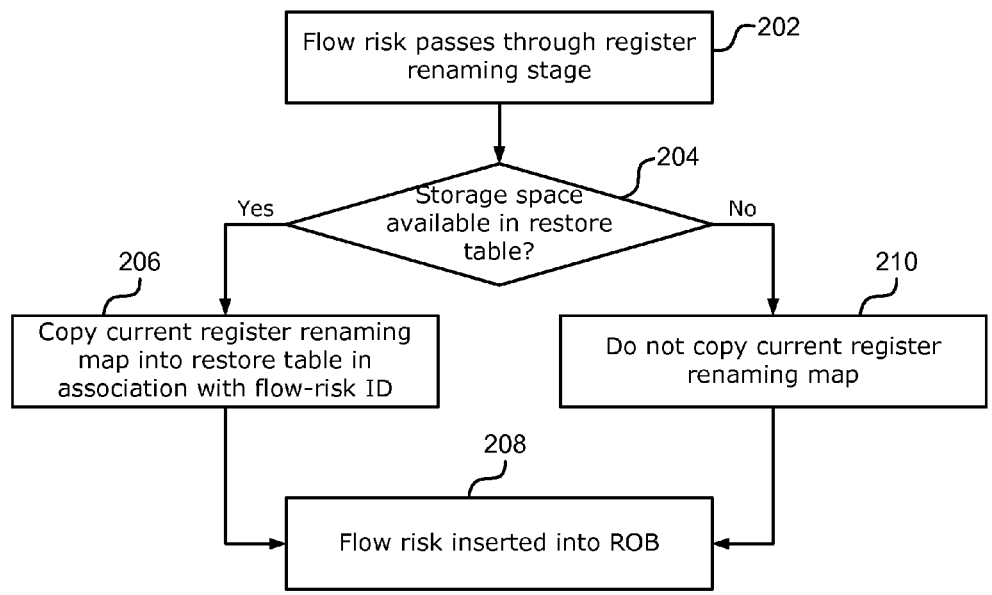
FIG. 2 illustrates a flow diagram of process for saving a copy of the register renaming map state.
Figure 3:
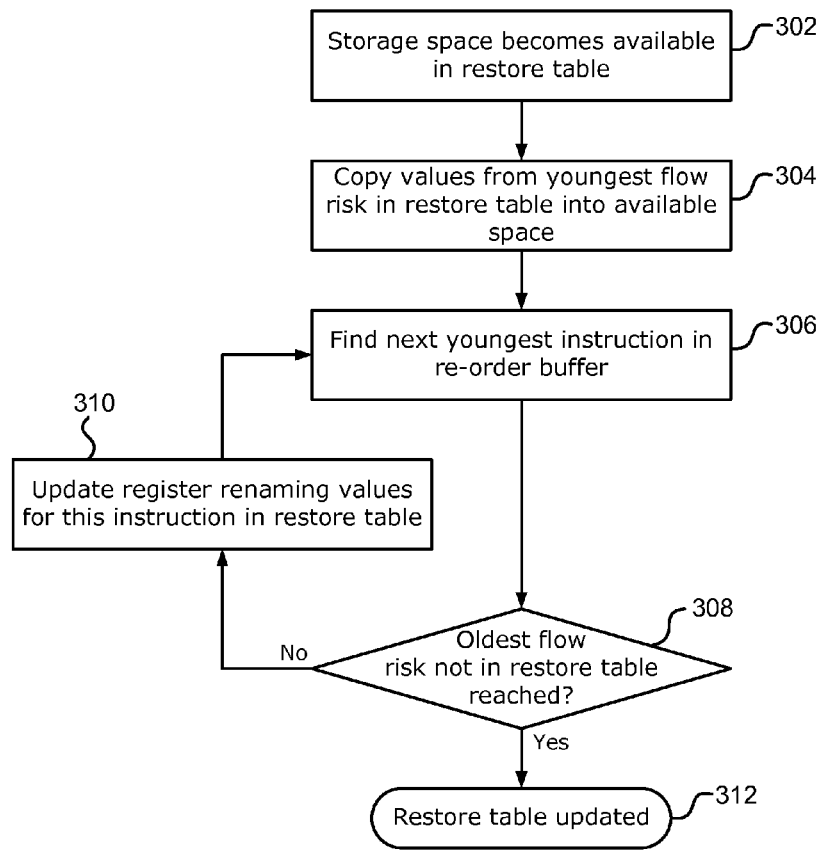
FIG. 3 illustrates a flow diagram of a process for generating a register renaming map state for an unrecorded flow-risk instruction.
Figure 4:
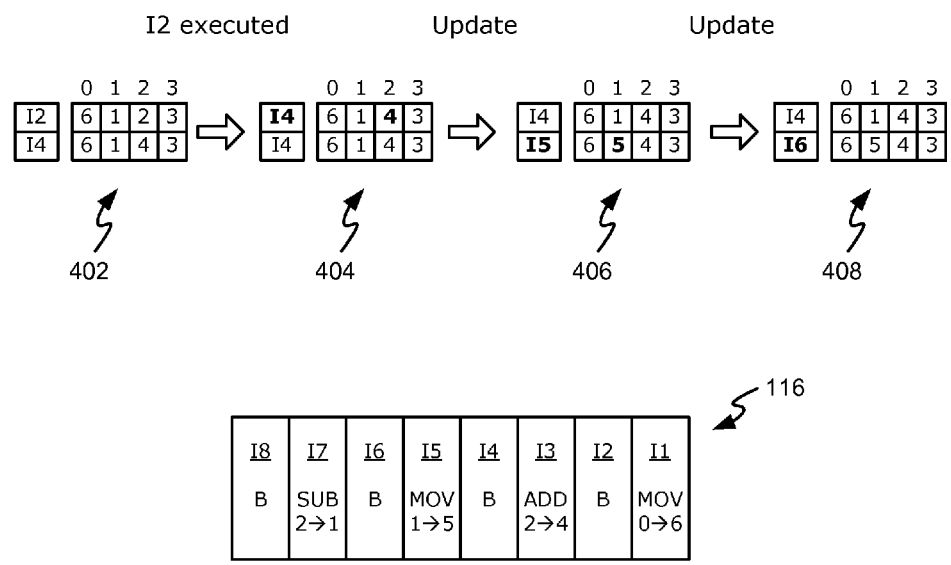
FIG. 4 illustrates an example restore table update sequence.
Figure 5:
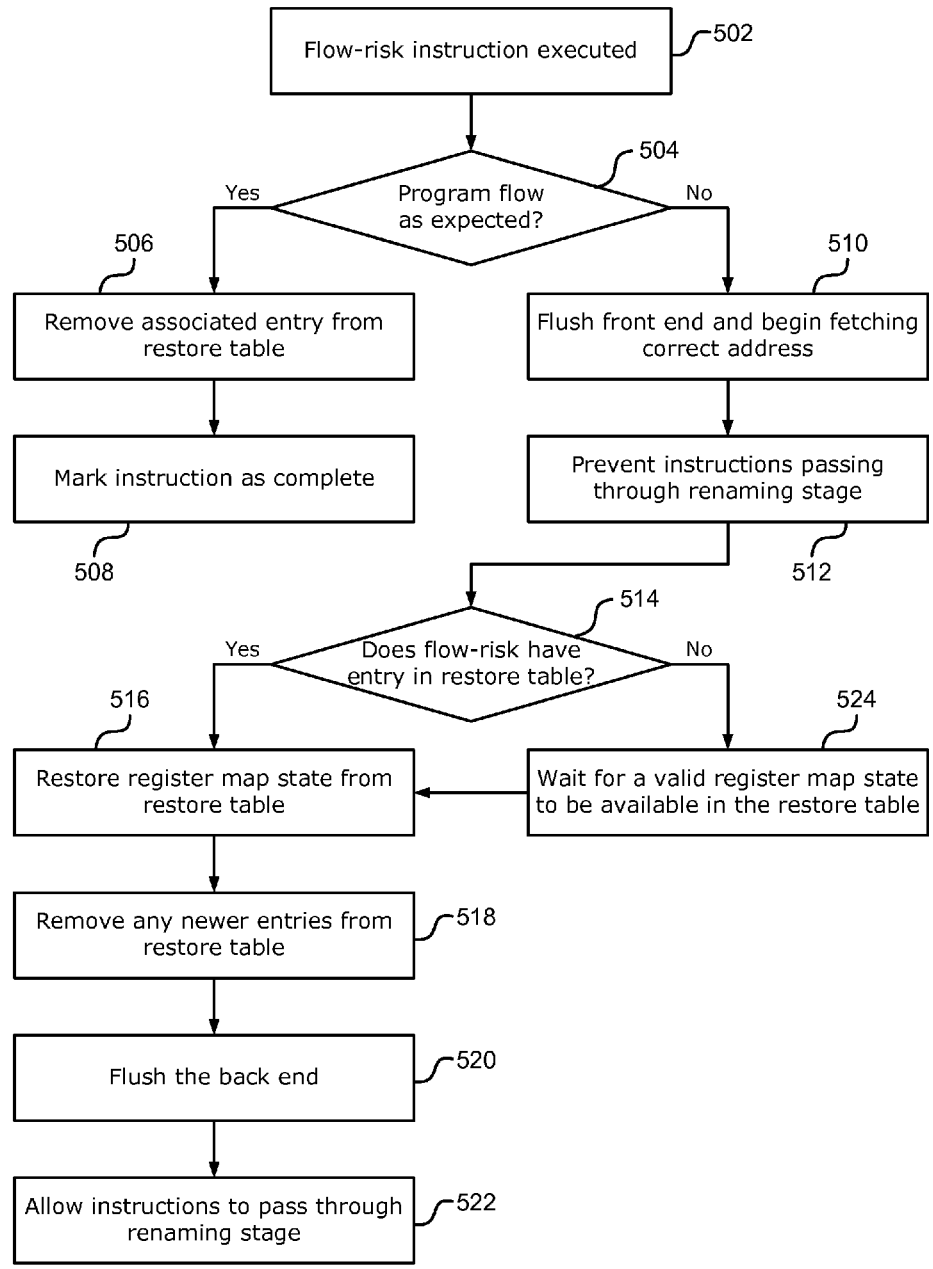
FIG. 5 illustrates a flow diagram of a process for restoring the register renaming map using the restore table.

Reference is now made to FIGS. 2 to 5, which illustrate a process for maintaining the restore table 118. FIG. 2 describes the process performed to handle the filling of the restore table as instructions pass through the renaming stage (i.e. before execution). FIGS. 3 and 4 describe the process for updating the entries in the restore table as instructions in the ROB are executed. FIG. 5, described later, outlines the process for using the restore table 118 to restore the register renaming map 106.

FIG. 2 shows a flowchart of a process for saving a copy of the register renaming map state in the restore table as flow-risk instructions are issued. In step 202 a flow-risk instruction passes through the renaming stage 104, and responsive to this it is determined in step 204 whether at least one storage location is available in the restore table 118. If so, then in step 206 the current state of the register renaming map 106 is copied into the available storage location of restore table 118 and stored in association with the identity of the flow-risk instruction. The flow-risk instruction is then inserted into the re-order buffer 108 in step 208. Conversely, if there are no storage locations available in the restore table 118, then in step 210 the current state of the register renaming map 106 is not copied. However, the flow-risk instruction is still inserted into the re-order buffer 108 in step 208, despite the register renaming map state not being stored. In other words, the instruction stream is not stalled, even though a copy of the register renaming map state is not made for a flow-risk instruction.

FIG. 3 shows a flowchart of a process for updating the restore table as instructions are executed in the re-order buffer. The process in FIG. 3 is used when the restore table is full (i.e. all storage locations are utilised) and flow-risk instructions have been inserted into the ROB without having their associated register renaming map state saved. When a flow-risk instruction is executed, then the storage location in the restore table used to store the register renaming map state for that instruction can be released (presuming that this flow-risk instruction had a register renaming map state saved in the restore table). As a result of this, in step 302, a storage location in the restore table becomes available.

In step 304, a copy of the register renaming map state for the youngest flow-risk instruction present in the restore table is copied into the available space. In other words, the most recent instruction (in program order) that has a saved register renaming map state is found, and its register renaming map state is copied into the available storage location. A pointer is then iterated from the youngest flow-risk instruction present in the restore table to the next youngest instruction in the re-order buffer 108 (not necessarily a flow-risk instruction) in step 306.

It is then determined in step 308 whether the instruction in the re-order buffer 108 at the pointer location is the oldest flow-risk instruction that does not have an entry stored in the restore table. In other words, it is determined whether this instruction is the oldest flow-risk instruction that was inserted into the ROB while the restore table was full. If not, then the register renaming map state in the available storage location is then updated in step 310 using values stored in the re-order buffer in association with this instruction. For example, the re-order buffer 108 can store in association with each instruction the mapping between the architectural destination register and physical register used to store the instruction result, and this value is used to update the register renaming map state (the updating of the register renaming map state is illustrated in more detail with reference to FIG. 4 below). The process then repeats from step 306, with the pointer iterating to the next youngest instruction in the re-order buffer 108.

Once the pointer reaches the oldest flow-risk instruction that does not have an entry stored in the restore table, then the determination in step 308 is positive, and the available storage location in the restore table has been updated to give the register renaming map state for this flow-risk instruction.

In other words, the process of FIG. 3 enables the register renaming map state to be derived for flow-risk instructions that did not previously have a register renaming map state saved, as storage locations become available. This is done by deriving the register renaming map state from information about the intervening instructions between a previous flow-risk instruction that did have a saved state in the restore table, and the flow-risk instruction that does not have a saved state in the restore table. This can be done "on the fly", which means that the register renaming map state can be derived before the flow-risk instruction has even executed. This operation is now illustrated in more detail with the numerical example of FIG. 4.

The example of FIG. 4 shows the contents 116 of the re-order buffer 108 of FIG. 1, and illustrates how the restore table 118 is updated when a flow-risk instruction is executed. In this purely illustrative example, the re-order buffer 108 contains eight instructions, denoted I1 to I8. I1 is a move instruction (denoted MOV) and the re-order buffer stores that for this instruction the destination architectural register was 0, and the register renaming stage mapped this to physical register 6. I2 is a branch instruction, and hence is a flow-risk. I3 is an addition instruction (denoted ADD) and the re-order buffer stores that for this instruction the destination architectural register was 2, and the register renaming stage mapped this to physical register 4. I4 is a branch instruction, and hence is a flow-risk. I5 is a move instruction and the re-order buffer stores that this instruction has a destination architectural register of 1, and the register renaming stage mapped this to physical register 5. I6 is a branch instruction, and hence is a flow-risk. I7 is a subtraction instruction (denoted SUB) and the re-order buffer stores that for this instruction the destination architectural register was 2, and the register renaming stage mapped this to physical register 1. Finally, I8 is a branch instruction, and hence is another flow-risk.

In this example, the restore table 118 has two storage locations. As shown at 402, the oldest two flow-risk instructions, I2 and I4 (the first two branch instructions to be inserted into the re-order buffer), have associated copies of the register renaming map state stored in the restore table. At this point, the restore table storage locations are all used, and hence for the additional flow-risk instructions (such as I6 and I8) that are inserted into the ROB, no copy of the register renaming map state is stored.

Then, in this illustrative example, I2 is executed. This means that the storage location associated with I2 can be released. As indicated at 404, the entries in the restore table move up, leaving the bottom storage location (in this example) available. As noted above with reference to FIG. 3, the youngest flow-risk instruction having a stored copy of the register renaming map state is copied into the available location. In this example, this is the register renaming map state for I4. Therefore, the register renaming map state and identity for I4 is copied into the available storage location (the bottom location in FIG. 4) at 404.

The pointer then moves to the next youngest instruction after the one used to copy values into the available storage location, i.e. the next youngest instruction after I4 in this example. This next youngest instruction is I5. The entry in the re-order buffer indicates that the register renaming for I5 mapped destination architectural register 1 to physical register 5. This information is used to update the register renaming map state at the available storage location. In this example, the restore table is updated as shown at 406 to show the identity of I5, and to change the value indexed by architectural register 1 to have a value of 5 (corresponding to the physical register used as destination by I5).

Because the instruction currently pointed to (I5) is not a flow-risk instruction, the process of FIG. 3 repeats, such that the pointer moves to the next youngest instruction in the re-order buffer. In this example, this is instruction I6. I6 is a branch instruction, and hence a flow-risk. Therefore, I6 is the oldest flow-risk instruction that does not have a register renaming map state stored in the restore table. To complete the derivation of the register renaming map state, as shown at 408, the available location is updated to show the identity of I6.

The example of FIG. 4 shows how, when a storage location becomes available, a register renaming map state for a previously unstored instruction (I6 in this example) is derived from the most-recently stored register renaming map state (for I4) and the register renaming values for intervening instructions (I5 here). This enables flow-risk instructions to still be passed into the ROB without being stalled, even though the register renaming state is not stored for these instructions.

Reference is now made to FIG. 5, which illustrates a flowchart of a process for handling the execution of flow-risk instructions, and the restoration of the register renaming map. In step 502, a flow-risk instruction is executed. It is then determined in step 504 whether or not this caused an unexpected change in program flow. For example, in the case of a branch instruction, it is determined whether the branch was correctly predicted. If the program flow was as-expected (e.g. correct branch prediction), then in step 506 the entry in the restore table associated with this flow-risk instruction is removed (so that the storage location becomes available, as mentioned above) and the instruction is marked as complete in step 508.

Conversely, if it was determined in step 504 that an unexpected change in program flow did occur (e.g. a branch misprediction), then a restore procedure begins. In step 510 the front end (e.g. including the fetch stage 102 and decode and renaming stage 104) is flushed (i.e. cleared), and the fetch stage begins fetching instructions from the correct address (e.g. from the correct branch path, or exception handler code). Instructions are prevented from passing through the renaming stage 104 in step 512.

In step 514, it is determined whether the flow-risk instruction that caused the unexpected change in program flow has an entry in the restore table. If so, then in step 516 the register renaming map 106 is restored using the entry in the restore table for the flow-risk instruction that caused the unexpected change in program flow. In other words, the register renaming map state for this flow-risk instruction is copied into (and overwrites) the register renaming map 106. This restores the register renaming map 106 to its state immediately prior to the flow-risk instruction that caused the unexpected change in program flow. In step 518, any entries in the restore table associated with newer instructions than the flow-risk instruction that caused the unexpected change in program flow are removed, and the back-end (including the ROB 108 and the commit stage 112) is flushed in step 520. Finally, in step 518, instructions are allowed to pass through the register renaming stage 104. The processor is then able to correctly continue with the instructions from the changed program flow. Note that whilst the operations performed in steps 518, 520, and 522 are illustrated as being sequential in FIG. 5, some or all of them can be performed in the same clock cycle.

Returning to step 514, if it is determined that the flow-risk instruction that caused the unexpected change in program flow does not have an entry in the restore table, then the processor waits in step 524 until a valid register renaming map state is available in the restore table for this flow-risk instruction. When this is available, the process repeats from step 516. A valid register renaming map state can become available when older flow-risk instructions have executed and space is available in the restore table, allowing the register renaming map state to be derived as described above.

The above-described technique therefore uses the time between flow-risk executions to create a register renaming map state for later flow-risks, and, as a result of this, the restore table does not need to be large enough for the expected number of flow-risks in flight. If there are enough storage locations, then the time it takes to update a flow-risk state from the previous state is effectively hidden by the fact that the flow-risk is unlikely to execute before a proportion of the previous flow-risks have executed.

Figure 6:
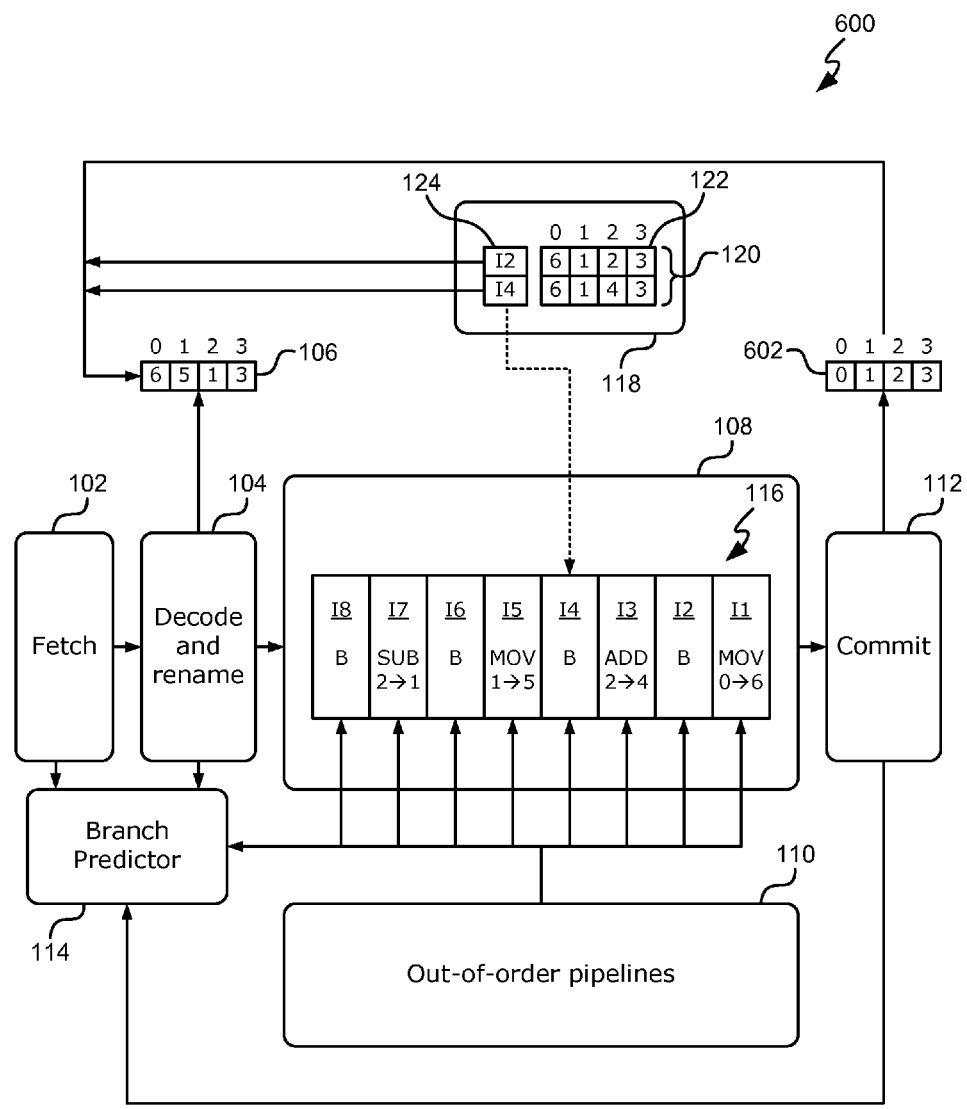
FIG. 6 illustrates an out-of-order processor having a register renaming map restore table and a commit map.
Figure 7:
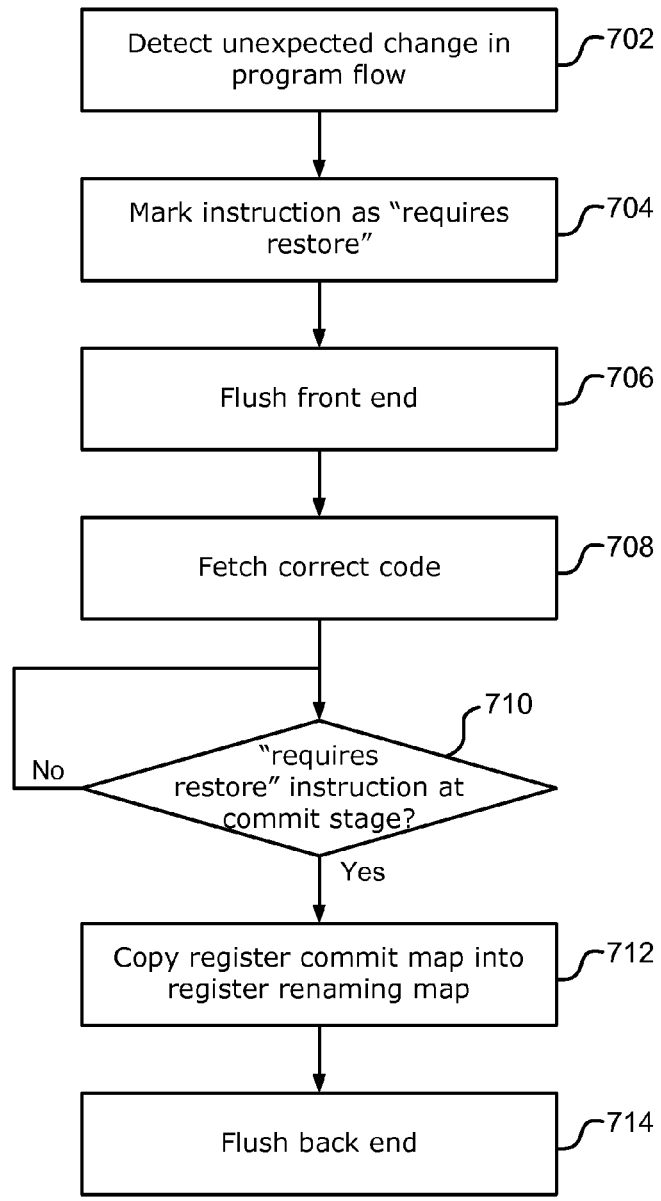
FIG. 7 illustrates a flow diagram of a process for restoring the register renaming map using the commit map.

Reference is now made to FIG. 6, which illustrates an enhancement to the above described technique, such that the out-of-order processor 600 has both a restore table and a commit map. The structure of FIG. 6 is similar to that described above with reference to FIG. 1, except that a commit map 602 is now connected to the commit stage 112. The commit map 602 comprises storage enabling it to hold a copy of the register renaming map state. The commit map 602 is arranged to maintain a version of the register renaming map state for the instructions that have been committed by the commit stage 112. This is achieved by updating the values for the physical register mapped to the destination architectural registers for an instruction whenever that instruction is committed by the commit stage 112.

For example, considering the example of FIG. 6, when instruction I1 is executed and reaches the commit stage 112, the commit map 602 is updated to change the physical register value associated with architectural register 0 to 6. This is because the MOV instruction of I1 had a destination architectural register of 0, and the register renaming stage 104 mapped this destination architectural register to physical register 6, which was recorded in the re-order buffer (as shown at 116). As further instructions are output from the re-order buffer 108 and committed, the commit map 602 is updated in a similar manner.

When an instruction is committed by the commit stage 112, it is no longer at risk of being "rewound" as a result of an unexpected change in program flow. The commit map 602 can therefore be used to restore the register renaming map 106 when unexpected changes in program flow occur. A process for restoring the register renaming map 106 using the commit map 602 is now described with reference to FIG. 7.

In step 702, an unexpected change in program flow is detected. For example, this can be in the form of an exception (such as a memory exception) or a branch misprediction. The instruction in the ROB causing the unexpected change in program flow is marked as "requires restore" (e.g. can have a restore bit set) in step 704. In step 706, the front end (e.g. including the fetch stage 102 and decode and renaming stage 104) is flushed (i.e. cleared), and in step 708 the fetch stage begins fetching instructions from the correct address (e.g. exception handler code, or code from the correct branch).

The process then waits, in step 710, until it is determined that the instruction marked "requires restore" has reached the commit stage 112. Once this instruction has reached the commit stage 112, then this means that all the instructions (in program order) prior to the instruction requiring restore have been committed, and hence the commit map 602 accurately reflects the register renaming map state up to that instruction. The register renaming map 106 can then be restored by copying the register renaming map state from the commit map 602 to the register renaming map 106 in step 712. Finally, the back-end (including the ROB 108 and the commit stage 112) is flushed in step 714. The processor is then able to correctly continue with the instructions from the changed program flow.

In some examples, the above-described technique for maintaining a commit map 602 and using it to restore the register renaming map 106 can be used to recover from unexpected changes in program flow where a longer latency in the recovery is acceptable (due to waiting for the offending instruction to reach the commit stage). For example, exceptions (such as memory exceptions) have a larger overhead due to the requirement to fetch the exception handler code, and latency in using the commit map to restore exceptions is acceptable. Furthermore, many memory exceptions tend to occur close to commit time anyway, which reduces the latency in using the commit map to restore.

The first technique based on the restore table (described above with reference to FIGS. 1 to 5) is therefore complementary to the second technique based on the commit map. The first technique using the restore table 118 enables a fast recovery from an unexpected change in program flow, but requires a certain amount of storage to be provided for the restore table (although less than using snapshots). This technique is therefore suited to recovery from branch mispredictions or similar situations where recovery may be needed relatively often (e.g. 5-10% of the time) and needs to be performed as fast as possible. Flow-risk instructions that have these requirements, such as branch instructions, can therefore be saved in the restore table as described above. Conversely, flow-risks that are more unlikely to cause unexpected changes in program flow or do not need to be restored as quickly, such as exceptions, can be handled using the commit map and hence do not need to have entries in the restore table. Therefore, the use of the commit map further reduces the amount of storage needed to be provisioned by the restore table, as this needs to save the register renaming map state for a lower number of flow-risks.

Furthermore, if the restore table technique is used on its own (i.e. without the commit map), then in some examples the derivation of the register renaming map state for unrecorded instructions is performed at least as fast as instructions are committed, as otherwise instructions can be output from the ROB before the derivation is complete. However, if a commit map is also provided, then the restore table does not need to perform the derivation as quickly. This is because if the restore table was not updated to contain the register renaming map state for the unrecorded instruction before the instruction was committed, then the commit map 602 can be used instead to restore the system. As a result of this, the update rate on the derivation of register renaming map state can be reduced, enabling both power and silicon area to be reduced.

In further examples, information from the branch predictor 114 can be used to determine whether to use the restore table technique or the commit map technique for recovery for a particular instruction. For example, the branch predictor can predict the direction that a branch instruction will take, but can also provide an estimate of the certainty of the prediction. If the certainty of the prediction is relatively low (e.g. lower than a predefined threshold), then the register renaming map state for the instruction can be stored in the restore table, as this allows fast recovery in the case that the predication is wrong. Conversely, if the certainty of the prediction is relatively high (e.g. higher than the predefined threshold), then the processor can rely on the commit map for recovery, as a misprediction is deemed more unlikely to occur and the commit map saves storage space.

In another further example, a plurality of restore tables can also be used, in which the different restore tables are of different sizes. In this example, the size of the restore table used for a particular instruction is related to the need for a rapid recovery. For example, a restore table comprising four entries can be used for high flow-risk instructions, a restore table comprising two entries used for medium flow-risk instructions (this is slower to recover, but is smaller) and a restore table comprising one entry for everything else (this is equivalent to the commit map described above).

The term "processor" and "computer" is used herein to refer to any device with processing capability such that it can execute instructions. Those skilled in the art will realize that such processing capabilities are incorporated into many different devices and therefore the term "computer" includes set top boxes, media players, digital radios, PCs, servers, mobile telephones, personal digital assistants and many other devices. Those of ordinary skill also would realize that a single device may have multiple computers.

Those skilled in the art will realize that storage devices utilized to store program instructions or data can be distributed across a network. For example, a remote computer may store an example of a process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, programmable logic array, or the like. A "tangible" or "non-transitory" article of machine or computer readable media includes any one or more media article(s), such as random access memory, flash memory, ferroelectric memory, optical disks that stores data for use by, and/or instructions for configuring programmable logic.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to "an" item refers to one or more of those items. The term "comprising" is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. In some situations, multiple steps separately identified may be accomplished by a single action. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of the examples.

I claim:
1. A method of restoring a register renaming map in an out-of-order processor, comprising:
  storing a copy of the register renaming map state in a storage location of a restore table whenever a flow-risk instruction is inserted into a re-order buffer, until all storage locations are utilised;
  determining that a storage location has subsequently become available;

generating a derived register renaming map state for an unrecorded flow-risk instruction inserted into the re-order buffer whilst all storage locations were utilised, based on a previously stored register renaming map state for an older flow-risk instruction and values stored in the re-order buffer for intervening instructions inserted between the older flow-risk instruction and the unrecorded flow-risk instruction;

storing the derived register renaming map state for the unrecorded flow-risk instruction at the available storage location; and in the event that execution of one of the flow-risk instructions causes an unexpected change in instruction flow, restoring the register renaming map using the register renaming map state associated with that flow-risk instruction in the restore table.

2. A method according to claim 1, further comprising clearing the register renaming map state associated with one of the flow-risk instructions from a storage location responsive to that flow-risk instruction being executed, such that that storage location becomes available.

3. A method according to claim 1, wherein the register renaming map state comprises a mapping between architectural registers and physical registers on the processor used to store instruction results.

4. A method according to claim 1, wherein the generating a derived register renaming map state comprises: identifying the older flow-risk instruction as the most recent flow-risk instruction inserted into the re-order buffer for which an associated register renaming map state has been stored in the restore table.

5. A method according to claim 1, wherein the generating a derived register renaming map state comprises: copying the register renaming map state associated with the older flow-risk instruction into the available storage location.

6. A method according to claim 5, wherein the generating a derived register renaming map state further comprises: iterating through each of the intervening instructions, and, at each iteration, updating the register renaming map state copied into the available storage location using the values stored in the re-order buffer.

7. A method according to claim 1, wherein the values stored in the re-order buffer comprise a mapping between a destination architectural register and a physical register for each intervening instruction.

8. A method according to claim 1, wherein the unrecorded flow-risk instruction is the oldest flow-risk instruction inserted into the re-order buffer whilst all storage locations of the restore table were utilised.

9. A method according to claim 1, wherein the number of storage locations is less than the number of flow-risk instructions that can be concurrently present in the re-order buffer.

10. A method according to claim 1, wherein the flow-risk instructions comprise an instruction capable of causing a change to a program counter of the processor.

11. A method according to claim 1, wherein the flow-risk instructions comprise a branch instruction.

12. A method according to claim 1, wherein the flow-risk instructions comprise an exception or interrupt instruction.

13. A method according to claim 1, further comprising updating a register commit map whenever an instruction is output from the re-order buffer to a commit stage, wherein the register commit map is updated using the re-order buffer values for the mapping between the destination architectural register and the physical register for each instruction output from the re-order buffer.

14. A method according to claim 13, further comprising, in the event that execution of an instruction causes an unexpected change in instruction flow and that instruction is output to the commit stage, restoring the register renaming map using the register commit map.

15. An out-of-order processor, comprising:
a register renaming map;
a re-order buffer; and
a restore table comprising a plurality of storage locations, wherein the processor is arranged to: store a copy of the register renaming map state in one of the storage locations responsive to a flow-risk instruction being inserted into the re-order buffer, until all storage locations are utilised; determine that a storage location has subsequently become available and, responsive thereto, generate a derived register renaming map state for an unrecorded flow-risk instruction inserted into the re-order buffer whilst all storage locations were utilised, based on a previously stored register renaming map state for an older flow-risk instruction and values stored in the re-order buffer for intervening instructions inserted between the older flow-risk instruction and the unrecorded flow-risk instruction; store the derived register renaming map state for the unrecorded flow-risk instruction at the available storage location; and in the event that execution of one of the flow-risk instructions causes an unexpected change in instruction flow, restore the register renaming map using the register renaming map state associated with that flow-risk instruction in the restore table.

16. An out-of-order processor according to claim 15, further comprising a plurality of physical registers arranged to store instruction data.

17. An out-of-order processor according to claim 16, further comprising a register renaming stage arranged to map architectural registers used in instructions to the physical registers, store the mapping between the architectural registers and physical registers in the register renaming map, and insert instructions into the re-order buffer.

18. An out-of-order processor according to claim 16, wherein the re-order buffer comprises a plurality of storage elements arranged to store instructions in program order, wherein each storage element is configured to store a mapping between an architectural destination register for the instruction at that storage element and a physical register.

19. An out-of-order processor according to claim 15, further comprising:
a commit stage arranged to receive executed instructions from the re-order buffer, and commit the executed instructions to memory; and
a register commit map arranged to store a mapping between the architectural destination register and the physical register for each instruction input to the commit stage.

20. An out-of-order processor according to claim 19, wherein the processor is further arranged to restore the register renaming map using the register commit map, in the event that execution of an instruction causes an unexpected change in instruction flow and that instruction is received at the commit stage.

* * * * *